(12) United States Patent
Goto

(10) Patent No.: US 12,437,549 B2
(45) Date of Patent: Oct. 7, 2025

(54) IMAGE PROCESSING APPARATUS AND VEHICLE

(71) Applicant: SUBARU CORPORATION, Tokyo (JP)

(72) Inventor: Yusuke Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/923,668

(22) PCT Filed: Jun. 11, 2021

(86) PCT No.: PCT/JP2021/022298
§ 371 (c)(1),
(2) Date: Nov. 7, 2022

(87) PCT Pub. No.: WO2022/259520
PCT Pub. Date: Dec. 15, 2022

(65) Prior Publication Data
US 2023/0377347 A1  Nov. 23, 2023

(51) Int. Cl.
*G06V 20/56* (2022.01)
*G06V 10/44* (2022.01)
*G06V 10/70* (2022.01)
*G06V 10/82* (2022.01)

(52) U.S. Cl.
CPC ............ *G06V 20/56* (2022.01); *G06V 10/443* (2022.01); *G06V 10/70* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2018/0217962 A1* | 8/2018 | Takahashi | G06F 9/30032 |
| 2019/0370609 A1 | 12/2019 | Akiyama et al. | |
| 2020/0065611 A1 | 2/2020 | Oshikiri | |
| 2020/0180612 A1* | 6/2020 | Finelt | B60W 60/0027 |
| 2022/0335276 A1* | 10/2022 | Yamakaji | G06N 3/045 |

FOREIGN PATENT DOCUMENTS

| | | |
|---|---|---|
| JP | 2018-97766 A | 4/2018 |
| JP | 2018-55470 A | 6/2018 |
| JP | 2020-30598 A | 2/2020 |

OTHER PUBLICATIONS

Gdeisat et al, Kernel Symmetry for Convolution Neural Networks, 2020, IEEE (Year: 2020).*

* cited by examiner

*Primary Examiner* — Bernard Krasnic
(74) *Attorney, Agent, or Firm* — TROUTMAN PEPPER LOCKE LLP

(57) ABSTRACT

An imaging processing apparatus according to one embodiment of the disclosure includes an extractor that extracts a feature quantity included in a captured image, and an object identifier that identifies an object on the basis of the feature quantity. The extractor extracts the feature quantity by executing, on the basis of the captured image, a convolution calculation using a filter including multiple filter values that are arranged two-dimensionally. The multiple filter values in the filter are set at respective values that are line-symmetric with respect to an axis of symmetry along a predetermined direction.

8 Claims, 12 Drawing Sheets

[ FIG. 1 ]
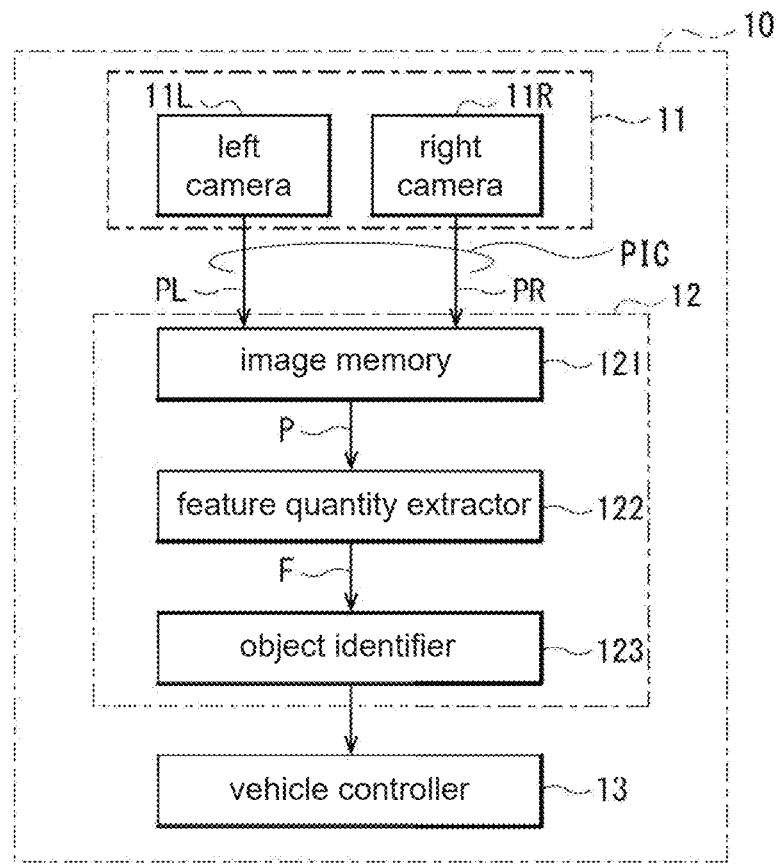
[ FIG. 2 ]
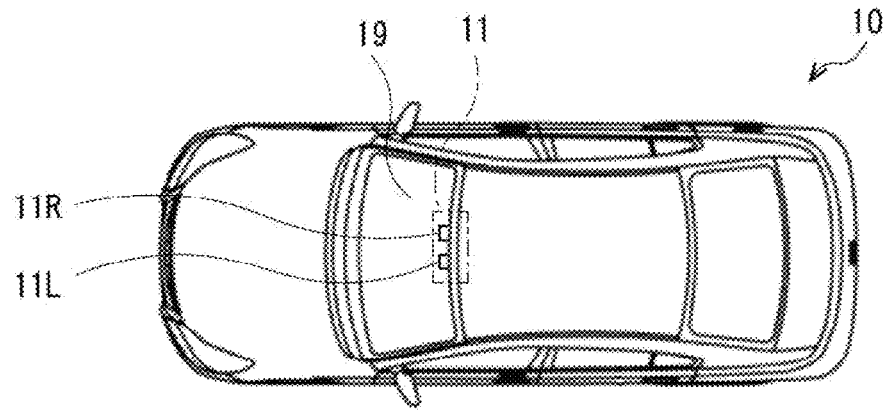

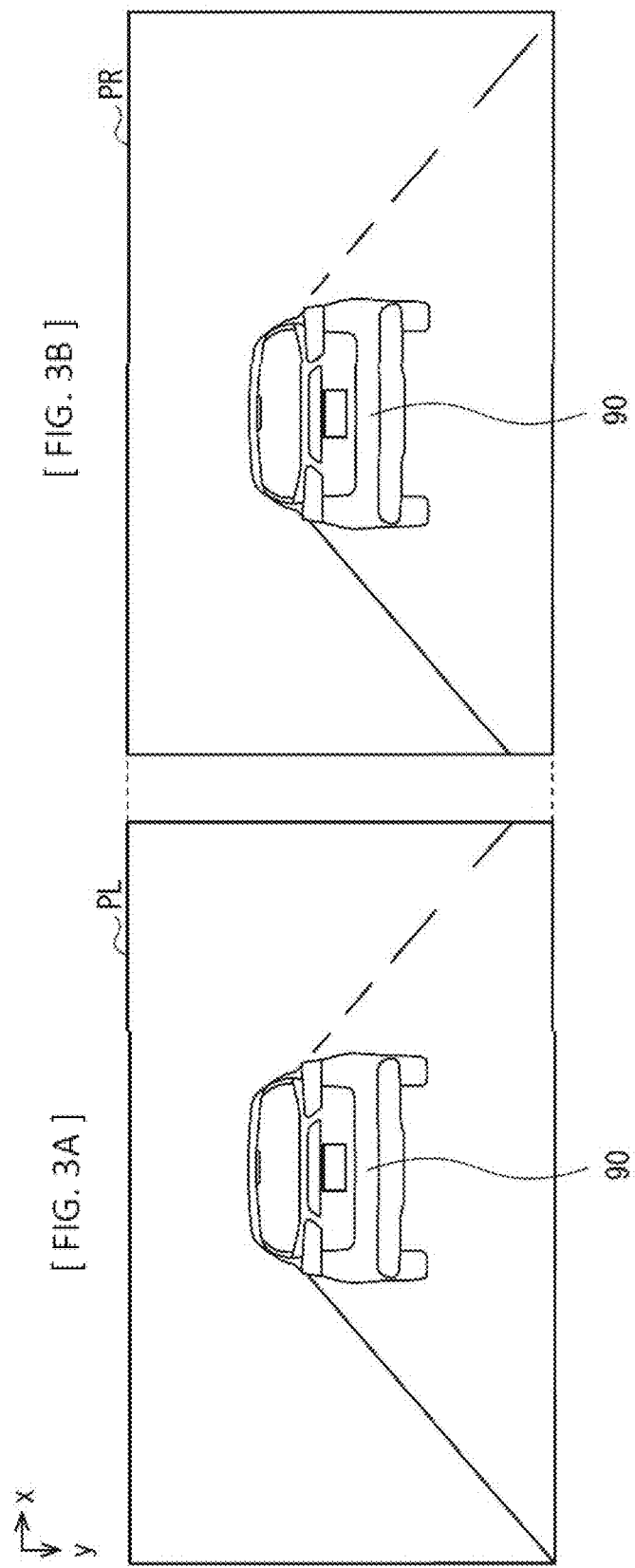

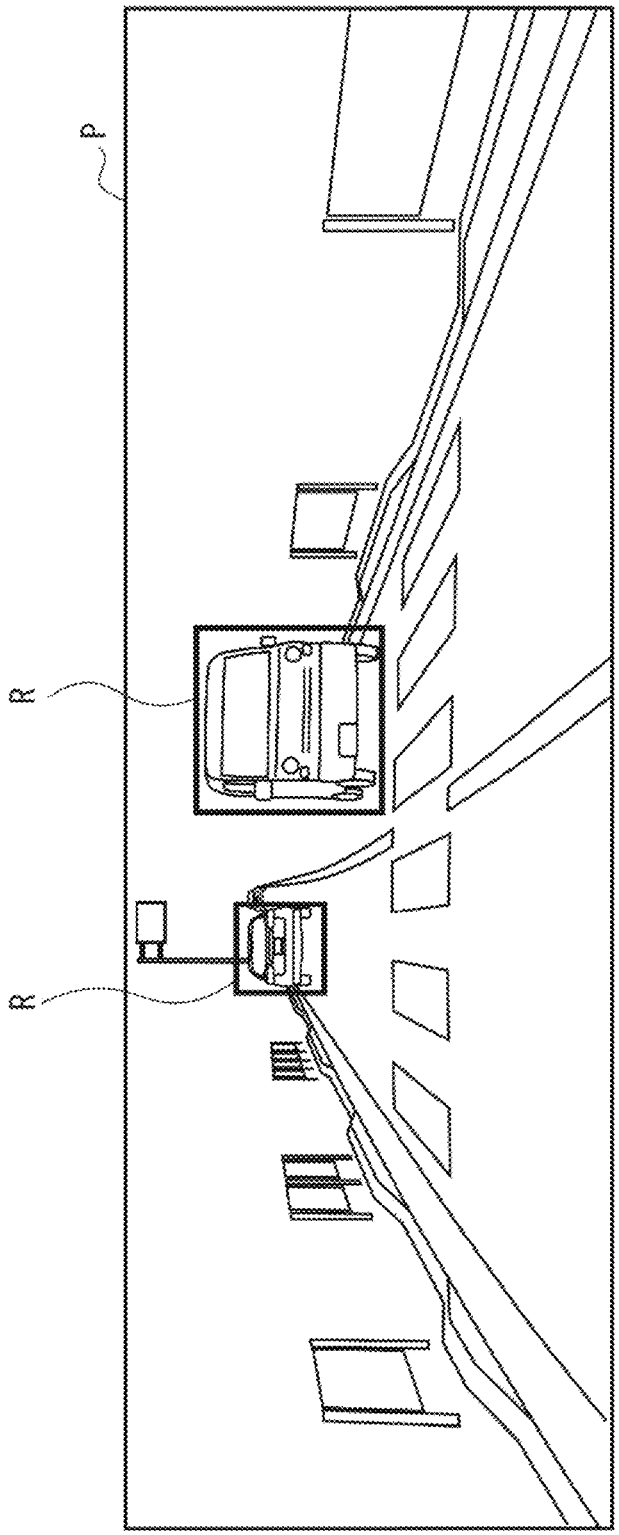
[FIG. 4]

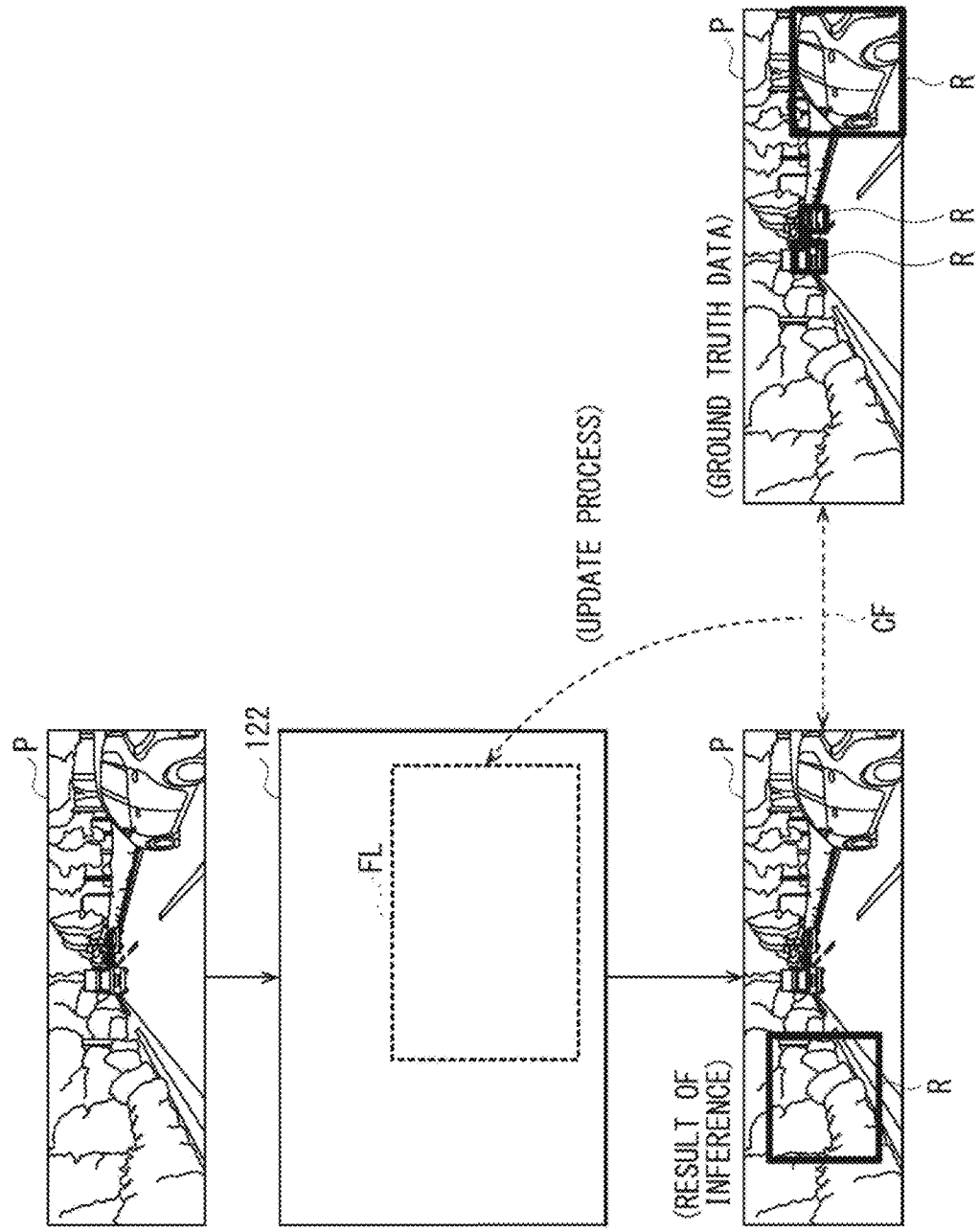

[ FIG. 6 ]
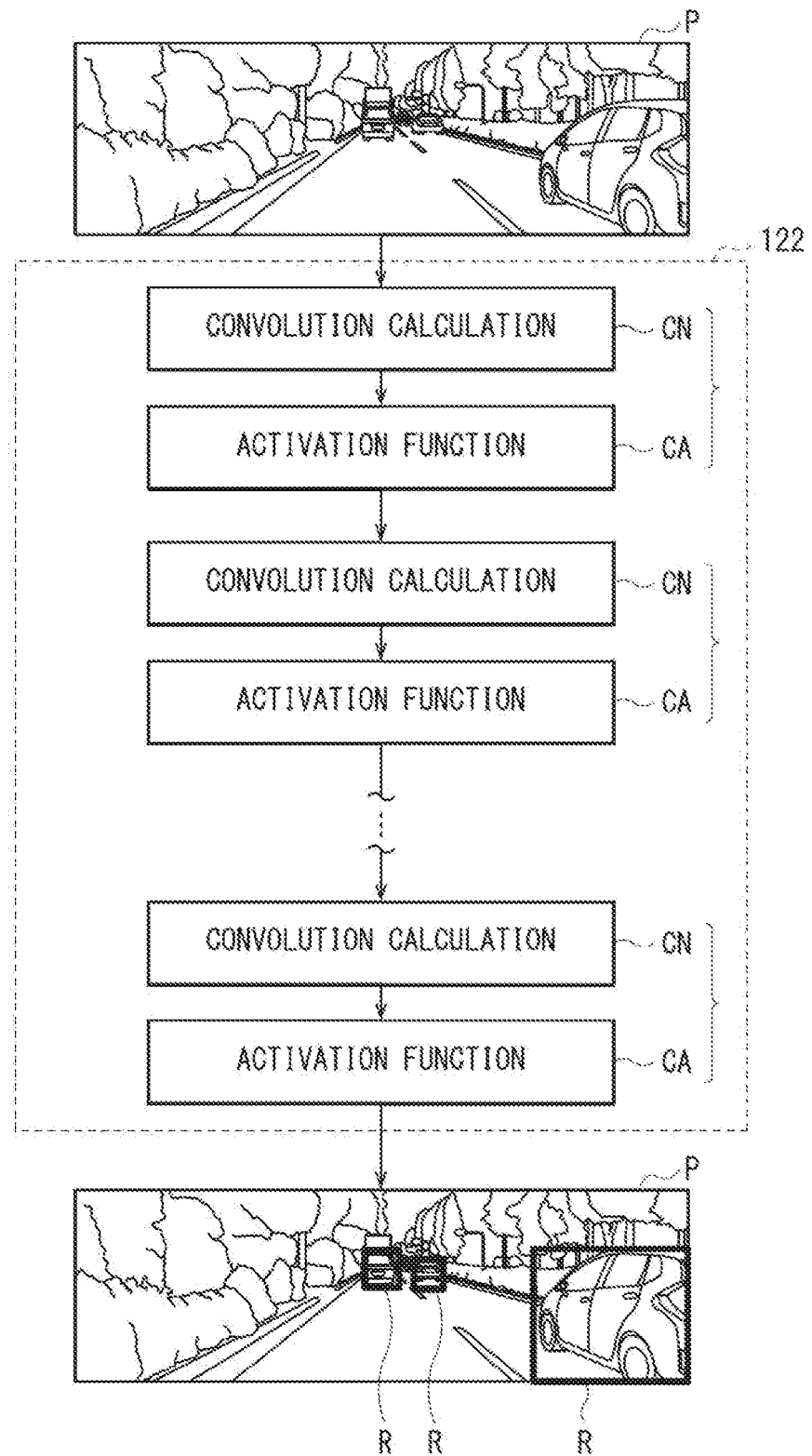

[ FIG. 7 ]
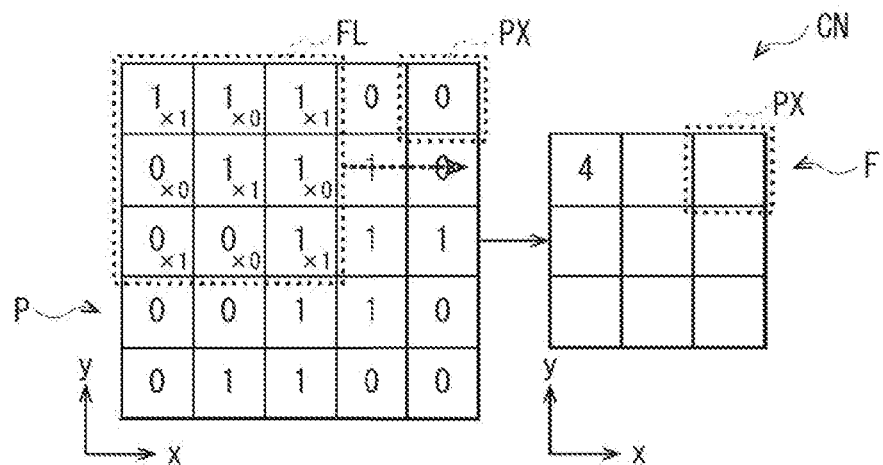
[ FIG. 8 ]
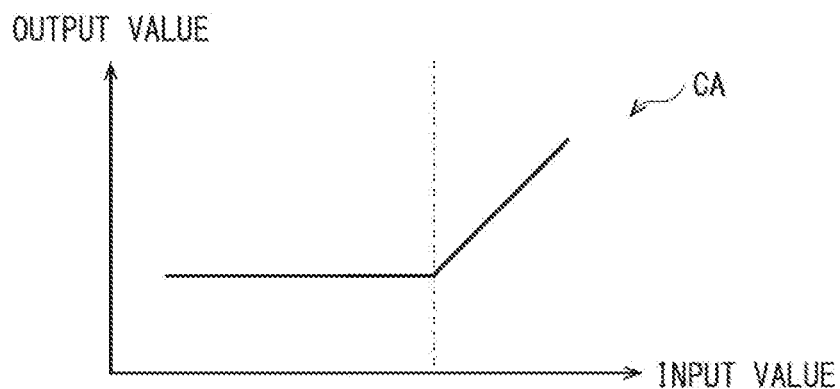
[ FIG. 9 ]
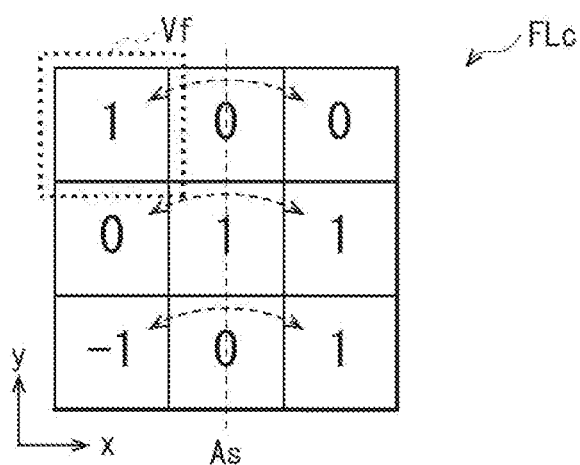

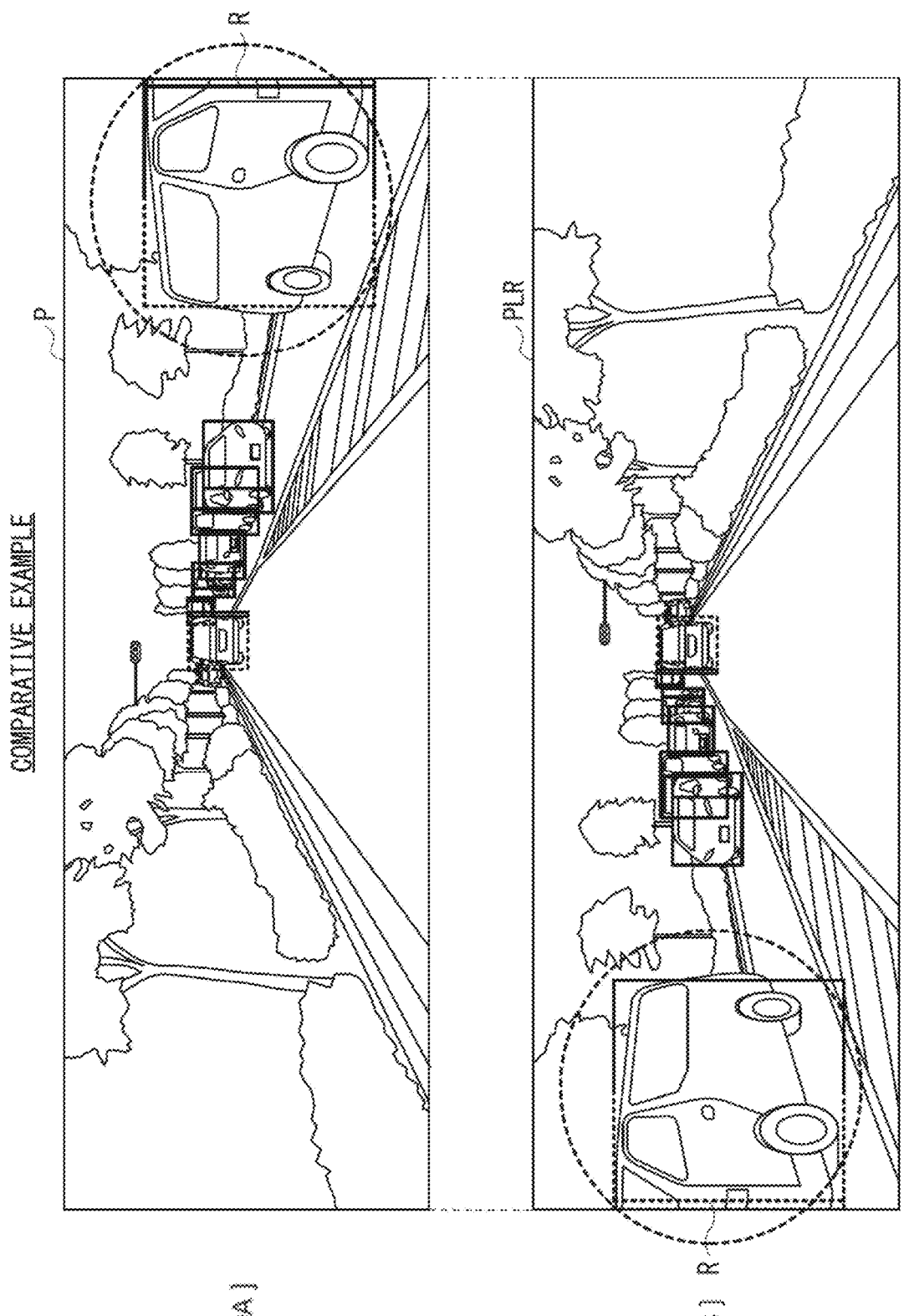

[ FIG. 11 ]
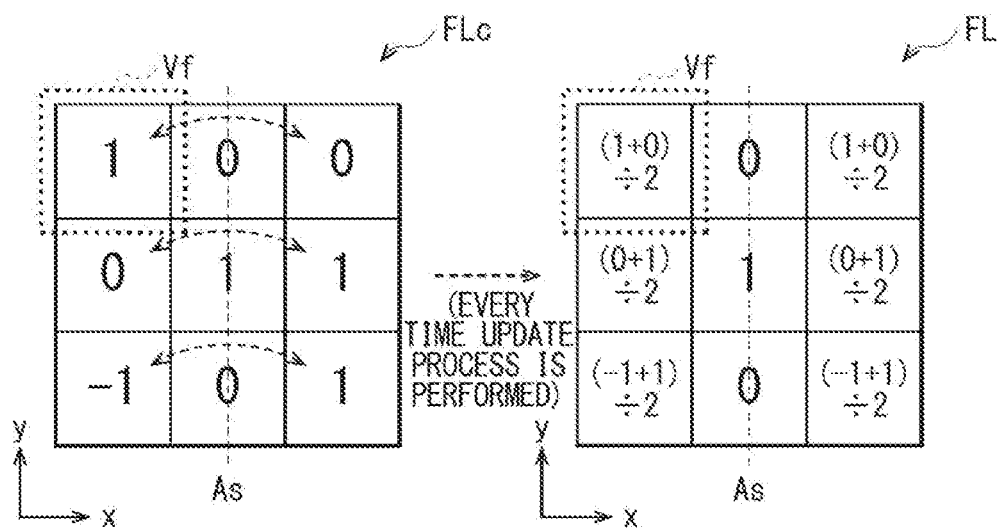
[ FIG. 12 ]
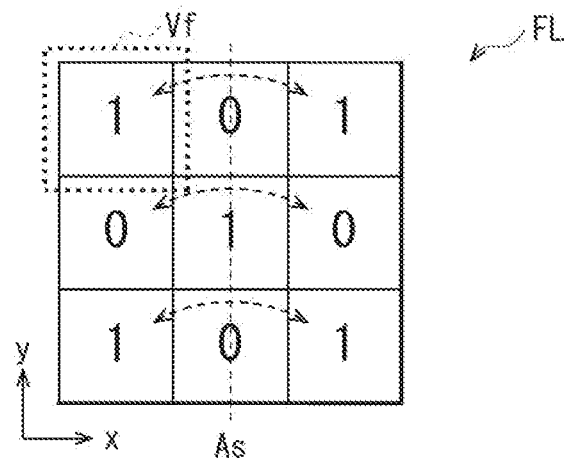

[ FIG. 13 ]
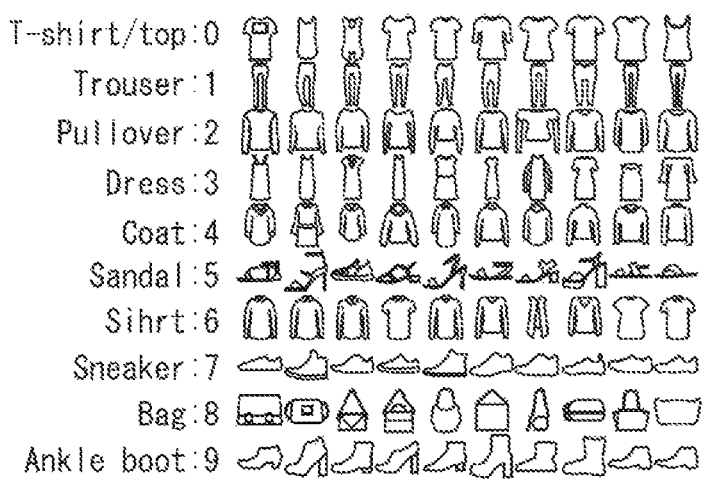

[ FIG. 14 ]

EXAMPLE

| CONVOLUTION CALCULATION (7x7) | ~ CN |
| ACTIVATION FUNCTION (Tanh) | ~ CA |
| CONVOLUTION CALCULATION (5x5) | |
| ACTIVATION FUNCTION (Tanh) | |
| CONVOLUTION CALCULATION (3x3) | |
| ACTIVATION FUNCTION (Tanh) | |
| CONVOLUTION CALCULATION (3x3) | |
| ACTIVATION FUNCTION (Tanh) | |
| CONVOLUTION CALCULATION (3x3) | |
| ACTIVATION FUNCTION (Tanh) | |
| CONVOLUTION CALCULATION (3x3) | |
| ACTIVATION FUNCTION (Tanh) | |
| CONVOLUTION CALCULATION (3x3) | |
| ACTIVATION FUNCTION (Tanh) | |
| CONVOLUTION CALCULATION (3x3) | |
| ACTIVATION FUNCTION (Tanh) | |
| CONVOLUTION CALCULATION (3x3) | |
| ACTIVATION FUNCTION (Tanh) | |
| CONVOLUTION CALCULATION (4x4) | ~ CN |
| ACTIVATION FUNCTION (Tanh) | ~ CA |
| Softmax | |

[FIG. 15]
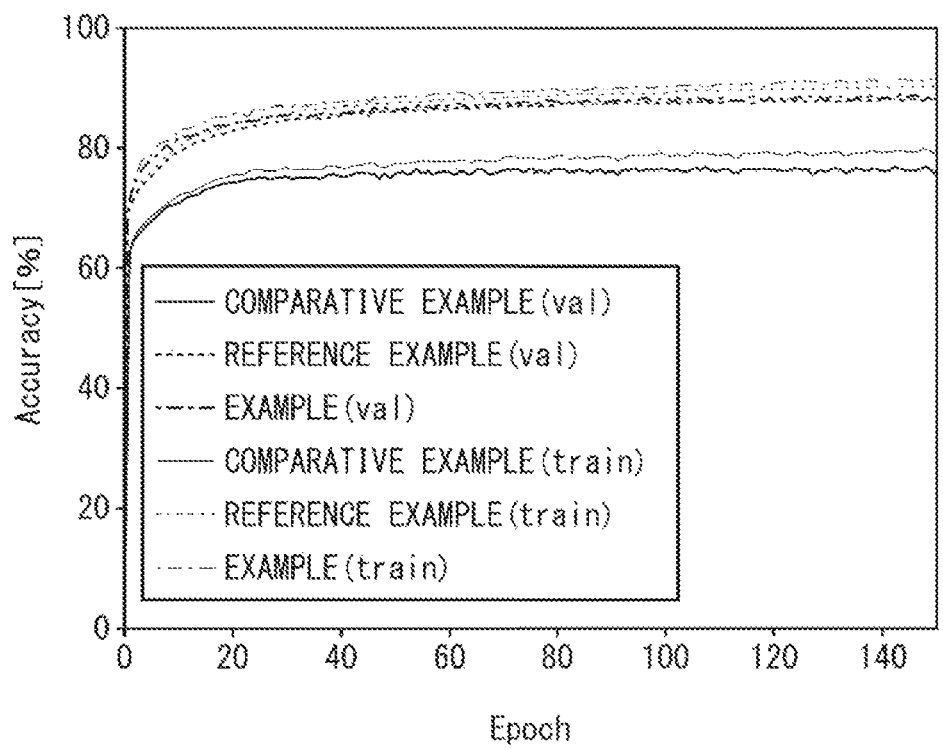
[FIG. 16]
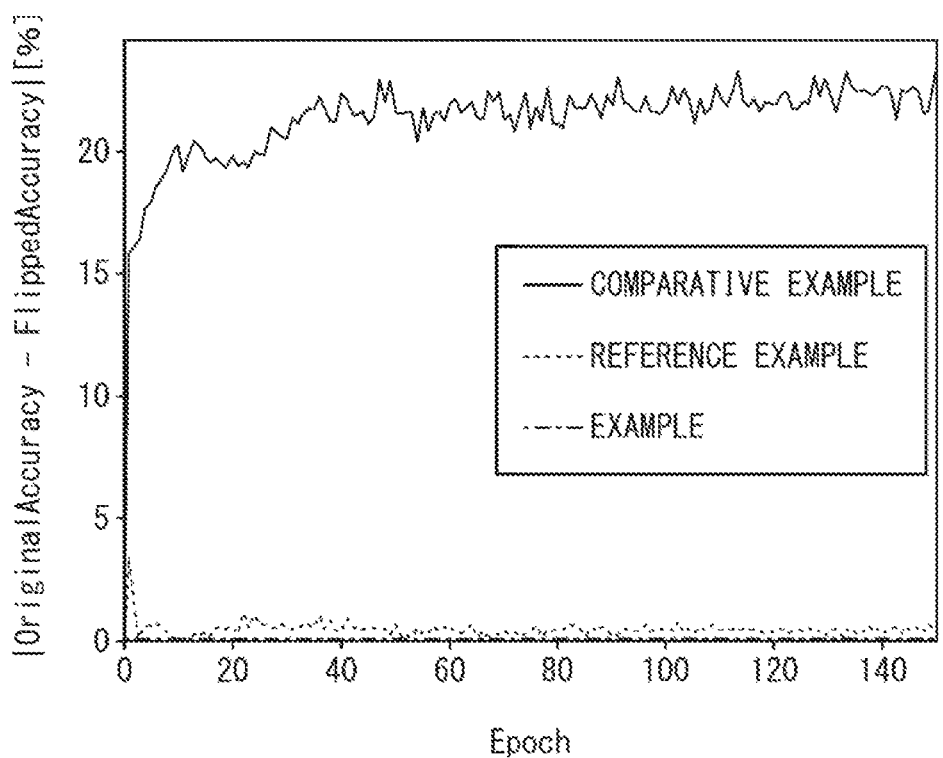

[FIG. 17]
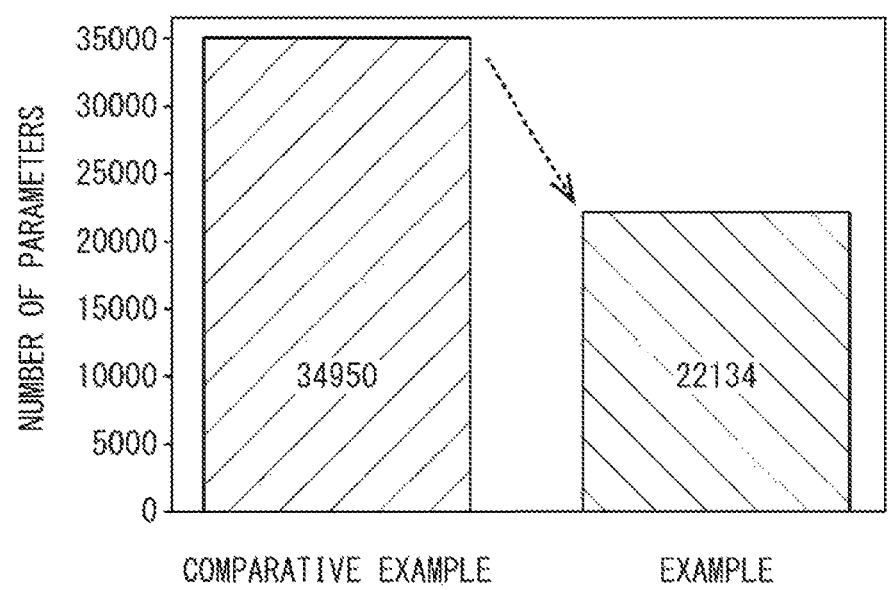

IMAGE PROCESSING APPARATUS AND VEHICLE

CROSS REFERENCE TO RELATED APPLICATION

The present application is a U.S. National Phase Application under 35 U.S.C. § 371 of International Patent Application No. PCT/JP2021/022298 filed Jun. 11, 2021. The entire contents of which are hereby incorporated by reference. CL TECHNICAL FIELD The disclosure relates to an image processing apparatus that performs object recognition on the basis of a captured image, and to a vehicle including the image processing apparatus.

BACKGROUND

A captured image obtained by an imaging apparatus includes images of various objects. For example, Japanese Unexamined Patent Application Publication No. 2018-97766 discloses an image processing apparatus that performs object recognition on the basis of such a captured image.

SUMMARY OF INVENTION

Meanwhile, what is demanded of such an imaging processing apparatus is to achieve lightness of a processing model and to secure a model performance. It is desirable to provide an image processing apparatus that makes it possible to secure a model performance while achieving lightness of a processing model, and to provide a vehicle including such an imaging processing apparatus.

A first image processing apparatus according to one embodiment of the disclosure includes an extractor that extracts a feature quantity included in a captured image, and an object identifier that identifies an object on the basis of the feature quantity. The extractor extracts the feature quantity by executing, on the basis of the captured image, a convolution calculation using a filter including multiple filter values that are arranged two-dimensionally. The multiple filter values in the filter are set at respective values that are line-symmetric with respect to an axis of symmetry along a predetermined direction.

A second image processing apparatus according to one embodiment of the disclosure includes one or more processors, and one or more memories communicably coupled to the one or more processors. The one or more processors extracts a feature quantity included in a captured image, identifies an object on the basis of the feature quantity, and extracts the feature quantity by executing, on the basis of the captured image, a convolution calculation using a filter including multiple filter values that are arranged two-dimensionally. The multiple filter values are set at respective values that are line-symmetric with respect to an axis of symmetry along a predetermined direction.

A vehicle according to one embodiment of the disclosure includes the image processing apparatus according to the foregoing embodiment of the disclosure, and a vehicle controller that performs vehicle control on the basis of a result of identification of the object by the object identifier.

BRIEF DESCRIPTION OF DRAWINGS

FIG. 1 is a block diagram illustrating a schematic configuration example of a vehicle according to one embodiment of the disclosure.

FIG. 2 is a top plan diagram schematically illustrating an outer configuration example of the vehicle illustrated in FIG. 1.

FIG. 3A and FIG. 3B are schematic diagrams illustrating an example of a left image and a right image generated by a stereo camera illustrated in FIG. 1.

FIG. 4 is a schematic diagram illustrating an example of image regions defined in a captured image.

FIG. 5 is a schematic diagram describing an outline of an update process on a filter to be used in a convolution calculation.

FIG. 6 is a schematic diagram illustrating an application example of the convolution calculation and an activation function at a feature quantity extractor illustrated in FIG. 1.

FIG. 7 is a schematic diagram illustrating a specific example of the process of the convolution calculation illustrated in FIG. 6.

FIG. 8 is a schematic diagram illustrating a specific configuration example of the activation function illustrated in FIG. 6.

FIG. 9 is a schematic diagram illustrating a configuration example of a filter according to Comparative Example.

FIG. 10A and FIG. 10B are schematic diagrams illustrating an example of results of object recognition using a filter according to Comparative Example.

FIG. 11 is a schematic diagram illustrating an example of an update process on the filter values of a filter according to one embodiment.

FIG. 12 is a schematic diagram illustrating a configuration example of the filter according to one embodiment.

FIG. 13 is a schematic diagram illustrating a configuration example of a data set according to Example or the like.

FIG. 14 is a schematic diagram illustrating a configuration example of a machine learning model according to Example or the like.

FIG. 15 is a diagram illustrating an example of respective results of object recognition according to Comparative Example, Reference Example, and Example.

FIG. 16 is a diagram illustrating another example of the respective results of object recognition according to Comparative Example, Reference Example, and Example.

FIG. 17 is a diagram illustrating an example of the respective numbers of parameters of Comparative Example and Example.

DETAILED DESCRIPTION

In the following, some embodiments of the disclosure are described in detail with reference to the drawings.

FIG. 1 is a block diagram illustrating a schematic configuration example of a vehicle (a vehicle 10) according to one embodiment of the disclosure. FIG. 2 is a top plan diagram schematically illustrating an outer configuration example of the vehicle 10 illustrated in FIG. 1.

As illustrated in FIG. 1, the vehicle 10 includes a stereo camera 11, an image processing apparatus 12, and a vehicle controller 13. Note that FIG. 1 omits the illustration of components including a drive power source (e.g., an engine or a motor) of the vehicle 10. For example, the vehicle 10 may be an electrically driven vehicle such as a hybrid electric vehicle (HEV) or an electric vehicle (EV), or may be a gasoline vehicle.

As illustrated in FIG. 2, for example, the stereo camera 11 is a camera that captures images of a view in front of the vehicle 10 to thereby generate paired images (a left image PL and a right image PR) having respective parallaxes. As illustrated in FIGS. 1 and 2, the stereo camera 11 includes a left camera 11L and a right camera 11R.

The left camera 11L and the right camera 11R each include, for example, a lens and an image sensor. As illustrated in FIG. 2, for example, the left camera 11L and the right camera 11R are disposed in the vicinity of an upper part of a windshield 19 of the vehicle 10 and spaced from each other by a predetermined distance in the width direction of the vehicle 10. The left camera 11L and the right camera 11R perform imaging operations in synchronization with each other. Specifically, as illustrated in FIG. 1, the left camera 11L generates the left image PL, and the right camera 11R generates the right image PR. The left image PL includes multiple pixel values, and the right image PR includes multiple pixel values. The left image PL and the right image PR constitute a stereo image PIC, as illustrated in FIG. 1.

FIGS. 3A and 3B illustrate an example of the stereo image PIC. Specifically, FIG. 3A illustrates an example of the left image PL, and FIG. 3B illustrates an example of the right image PR. Note that x and y in FIGS. 3A and 3B respectively represent an x-axis and a y-axis. In this example, another vehicle (a preceding vehicle 90) is traveling ahead of the vehicle 10 on the traveling road on which the vehicle 10 is traveling. The left camera 11L captures an image of the preceding vehicle 90 to generate the left image PL, and the right camera 11R captures an image of the preceding vehicle 90 to generate the right image PR.

The stereo camera 11 is configured to generate the stereo image PIC including the left image PL and the right image PR. In addition, the stereo camera 11 performs the imaging operations at a predetermined frame rate (e.g., 60 [fps]) to generate a series of stereo images PIC.

The image processing apparatus 12 performs various image processing (a process for recognizing an object present in front of the vehicle 10) on the basis of the stereo image PIC received from the stereo camera 11. As illustrated in FIG. 1, the image processing apparatus 12 includes an image memory 121, a feature quantity extractor 122, and an object identifier 123.

The image processing apparatus 12 includes, for example, one or more processors (central processing units (CPUs)) each executing a program, and one or more memories communicably coupled to the one or more processors. In addition, these memories each include, for example, a random-access memory (RAM) that temporarily holds processing data, and a read-only memory (ROM) that holds the program.

Note that the feature quantity extractor 122 corresponds to a specific example of an "extractor" in the disclosure.

As illustrated in FIG. 1, the image memory 121 temporarily holds the left image PL and the right image PR included in the stereo image PIC. In addition, the image memory 121 sequentially supplies, as a captured image P, at least one of the left image PL or the right image PR stored therein to the feature quantity extractor 122 (see FIG. 1).

The feature quantity extractor 122 extracts a feature quantity F included in one or more the image regions R in the captured image P (here, either one of the left image PL or the right image PR) read from the image memory 121 (see FIG. 1). The feature quantity F includes pixel values of multiple pixels that are arranged in a matrix (two-dimensionally), as will be described in detail later (FIG. 7). Note that, examples of the feature quantity F include red, green, and blue (RGB) feature quantities and histograms of oriented gradients (HOG) feature quantities.

As will be described in detail later, the feature quantity extractor 122 defines the image regions R described above in the captured image P and extracts the feature quantity F described above by using a trained model such as a deep neural network (DNN) (i.e., by using machine learning). To define the image region R, the feature quantity extractor 122 identifies, for example, an object in the captured image P and outputs the coordinates of the identified object to thereby define a rectangular region as the image region R.

FIG. 4 schematically illustrates an example of the image region R. In the example illustrated in FIG. 4, two image regions R are respectively defined for two vehicles in the captured image P. Although the image regions R are defined for vehicles in this example, the image regions R are not limited to this example. For example, the image regions R may be defined for other objects including, without limitation, humans, guardrails, and walls.

Here, with reference to FIGS. 5 to 8, a detailed description is given of a process for extracting the feature quantity F included in the captured image P (i.e., in one or more image regions R) to be performed by the feature quantity extractor 122.

FIG. 5 schematically illustrates an outline of an update process on a filter FL to be used in a convolution calculation, which will be described later. FIG. 6 schematically illustrates an application example of the convolution calculation and an activation function at the feature quantity extractor 122 to be described later. FIG. 7 schematically illustrates a specific example of the process of the convolution calculation illustrated in FIG. 6. FIG. 8 schematically illustrates a specific configuration example of the activation function illustrated in FIG. 6.

First, as illustrated in FIG. 5, for example, the feature quantity extractor 122 performs calculations including the convolution calculation using the filter FL to be described later on the received captured image P to thereby obtain a result of inference of object recognition (e.g., a result of extraction of the feature quantity F in the image region R described above) by machine learning. The result of inference thus obtained is compared with ground truth data of the object recognition (see the broken-line arrow CF in FIG. 5) as needed, and an update process on parameters (i.e., filter values to be described later) of the filter FL is performed as needed to cause a difference between the result of inference and the ground truth data to be smaller. That is, the update process on the filter values of the filter FL is executed as needed every time the filter FL is updated by machine learning to thereby generate a trained model of the machine learning.

In this way, unlike an existing rule-based development that involves defining a specific processing formula, a large number of pieces of training data for machine learning and a large number of pieces of ground truth data corresponding to the respective pieces of training data are prepared to repeat the update process described above. As a result, an inference result that matches the ground truth data is obtained.

Thereafter, as illustrated in FIG. 6, for example, the feature quantity extractor 122 performs multiple kinds of calculation processes on the basis of the received captured image P multiple times using the trained model thus obtained, thereby performing object recognition (e.g., extraction of the feature quantity F) in each image region R in the captured image P. Specifically, the feature quantity extractor 122 performs, as the multiple kinds of calculation processes described above, a convolution calculation CN using the filter FL described above and a calculation using an activation function CA alternately multiple times (see FIG. 6).

Here, as illustrated in FIG. 7, for example, the convolution calculation CN described above is performed in the following manner. For example, first, the feature quantity extractor 122 defines a region having a predetermined size (3 pixels by 3 pixels in this example) in the captured image P including multiple pixels PX that are two-dimensionally arranged in a matrix. Further, the feature quantity extractor 122 performs a weighted summation of the nine pixel values (each of which is "0" or "1" in this example) in the defined region, with nine filter values in the filter FL as weighting coefficients. As a result of the weighting summation, a value of the feature quantity F (which is "4" in this example) in the region is obtainable. Note that, in the example illustrated in FIG. 7, the filter values (each denoted as "x0" or "x1") in the filter FL are two-dimensionally arranged in a matrix to make the total number equal to nine (three along a row direction or an x-axis direction by three along a column direction or a y-axis direction). The feature quantity extractor 122 then defines the regions one by one in the captured image P by shifting the last defined region by one pixel, and performs the weighted summation using the filter FL described above for each of the defined regions individually to thereby calculate the value of the feature quantity F of each region one by one. As illustrated in FIG. 7, for example, the feature quantity F including the multiple pixels PX two-dimensionally arranged in a matrix is thus extracted. Note that the filter FL described above is separately set for each of multiple executions of the convolution calculation CN illustrated in FIG. 6, for example.

In addition, as illustrated in FIG. 8, for example, the calculation using the activation function CA described above is performed in the following manner. For example, the activation function CA illustrated in FIG. 8, for example, is applied to an input value (i.e., a value of each pixel PX of the feature quantity F obtained by the corresponding convolution calculation CN) to obtain an output value after the application of the activation function CA. Note that, in the example of FIG. 8, the output value is set at a fixed value (e.g., "0") in a case where the input value is less than a predetermined value, whereas the output value is set to linearly increase in accordance with the magnitude of the input value in a case where the input value is greater than or equal to the predetermined value.

The feature quantity F obtained as a result of the multiple kinds of calculation processes performed multiple times is supplied from the feature quantity extractor 122 to the object identifier 123 (see FIG. 1).

The object identifier 123 identifies an object in the captured image P (i.e., each of the one or more image regions R described above) on the basis of the feature quantity F extracted by the feature quantity extractor 122. For example, in a case where the image of the image region R represents a vehicle, the feature quantity F includes the features of the vehicle; and in a case where the image of the image region R represents a human, the feature quantity F includes the features of the human. The object identifier 123 thus identifies an object in each of the image regions R on the basis of the feature quantity F.

Thereafter, the object identifier 123 assigns, to each of the image regions R, a category indicating what the object is. Specifically, in a case where the object in the image of the image region R is a vehicle, the object identifier 123 assigns a category representing a vehicle to the image region R. In a case where the object in the image of the image region R is a human, the object identifier 123 assigns a category representing a human to the image region R.

The vehicle controller 13 performs various kinds of vehicle control on the vehicle 10 on the basis of the result of object identification by the object identifier 123 (or the result of object recognition at the image processing apparatus 12) (see FIG. 1). Specifically, the vehicle controller 13 performs, for example, travel control on the vehicle 10, operation control on various components of the vehicle 10, or another kind of vehicle control on the basis of the result of object identification (or the result of object recognition).

Like the image processing apparatus 12, the vehicle controller 13 includes, for example, one or more processors (CPUs) each executing a program, and one or more memories communicably coupled to the one or more processors. As in the image processing apparatus 12, these memories each include, for example, a RAM that temporarily holds processing data, and a ROM that holds the program.

Operation, Workings, and Effects

Operations, workings, and effects of the present embodiment will now be described in detail in comparison with Comparative Example.

FIG. 9 schematically illustrates a configuration example of a typical filter FLc according to Comparative Example. FIGS. 10A and 10B schematically illustrate an example of results of object recognition (or results of object identification) according to Comparative Example.

First, the filter FLc of Comparative Example illustrated in FIG. 9 includes multiple filter values Vf that are set at any values, unlike the filter FL according to the present embodiment (FIGS. 11 and 12) to be described later. Specifically, unlike the filter FL of the present embodiment to be described later, the filter FLc of Comparative Example includes the filter values Vf that are not line-symmetric (horizontally symmetric) with respect to a predetermined axis of symmetry As (see the broken-line arrows in FIG. 9).

Meanwhile, the convolution calculations in the DNN described above typically have the following concerns.

For example, first, a filter for a convolution calculation is typically provided separately for each of multiple executions of the convolution calculation, as described above. Accordingly, the number of parameters (i.e., the number of values represented by the filter values Vf) set for each filter is very large (e.g., the order of several millions) in an entire trained model. This makes it difficult to achieve lightness of the processing model (the trained model) in image processing (object recognition), resulting in high difficulty of, for example, small-scale hardware implementation, such as integration. To address this concern, some approaches are conceivable including reducing the model size itself and reducing accuracy of the convolution calculation. However, there is a trade-off with a model performance (recognition performance).

Further, it is desired that the object recognition performance be horizontally symmetric because travel environments for vehicles (i.e., whether vehicles should travel on the left side or should travel on the right side) are generally different from country to country. In convolution calculations in a typical DNN, however, the object recognition performance is horizontally asymmetric. This makes it necessary that individual evaluation works be performed upon machine learning for both of a case of the left-side travel environment and a case of the right-side travel environment, resulting in an increase in the number of evaluation steps. To address this concern, some approaches are conceivable including performing training with artificially prepared horizontally flipped images in machine learning. However, strict horizontal symmetry is not achievable even with such an approach, resulting in an increase in the number of evaluation steps.

Specifically, as illustrated in FIGS. 10A and 10B, for example, in the case where the travel environment for vehicles in the original captured image P was the left-side travel environment (see FIG. 10A), the result of object recognition on the above-described artificially prepared horizontally flipped image PLR (see FIG. 10B) was as described below. Note that, in each of part FIG. 10A and FIG. 10B, the image region R that was defined in the object recognition is illustrated partly in solid lines and partly in broken lines. The solid-line portion of the image region R corresponds to a front portion of a recognized vehicle, and the broken-line portion of the image region R corresponds to a rear portion of the recognized vehicle.

According to the result of object recognition on the original captured image P illustrated in FIG. 10A, the front portion and the rear portion of the recognized vehicle were accurately recognized, as seen from the image region R encircled in a broken line, for example. In contrast, according to the result of object recognition on the horizontally flipped image PLR illustrated in FIG. 10B, the object recognition was partly inaccurate, unlike the case with the original captured image P. Specifically, as seen from the image region R encircled in a broken line in FIG. 10B, for example, the front portion and the rear portion of the recognized vehicle were reversed. It is thus apparent that the object recognition performance was not horizontally symmetric in the example illustrated in FIG. 10A and FIG. 10B.

Thus, in a case where the filter FLc according to Comparative Example is used, it is difficult to achieve lightness of the processing model (trained model) and to secure a model performance (recognition performance) in the image processing (object recognition).

To address this concern, as illustrated in FIGS. 11 and 12, for example, the filter FL of the present embodiment includes the multiple filter values Vf that are set as described below, unlike the filter FLc of Comparative Example. Note that FIG. 11 schematically illustrates an example of the update process on the filter values Vf in the filter FL of the present embodiment. FIG. 12 schematically illustrates a configuration example of the filter FL of the present embodiment.

First, as illustrated in FIG. 12, for example, the multiple filter values Vf in the filter FL of the present embodiment are set at respective values line-symmetric with respect to an axis of symmetry As along a predetermined direction (the y-axis direction in this example). Specifically, in this example, the line symmetry is horizontal symmetry with respect to the axis of symmetry As (i.e., symmetry along the x-axis direction), and the multiple filter values Vf are set at horizontally symmetric values (see the broken-line arrows in FIG. 12).

Further, such setting of the filter values Vf at horizontally symmetric values is performed in the following manner, as illustrated in FIG. 11, for example. For instance, the update process on the multiple filter values Vf is executed as needed every time the filter FL is updated by machine learning described above (see FIG. 5). As a result, the multiple filter values Vf in the filter FL are set at the line-symmetric values as described above. Specifically, the update process on the filter values Vf in this case is performed in the following manner as indicated by broken line arrows and calculation formulae (division formulae) in FIG. 11, for example. For instance, the update process is a process for updating each of every two filter values Vf located at two line-symmetric positions (horizontally symmetric positions in this example) with respect to the axis of symmetry As described above to an average value of the two filter values Vf located at the two line-symmetric positions. Through such an update process, as illustrated in FIG. 11, for example, the configuration in which the multiple filter values Vf are not line-symmetric (the filter values Vf are set at any values) as in Comparative Example described above is updated to the filter FL representing the line-symmetry described above.

Further, as illustrated in FIGS. 11 and 12, for example, the multiple filter values Vf are set at respective values horizontally symmetric in the filter FL of the present embodiment. This allows horizontal symmetry to be secured regarding the result of object identification (the result of object recognition) by the object identifier 123. Specifically, for example, horizontal symmetry is securable regarding the result of object identification by the object identifier 123 in both of a case where the travel environment for the vehicle 10 is the left-side travel environment and a case where the travel environment for the vehicle 10 is the right-side travel environment. The present embodiment thus achieves the following, unlike the case of Comparative Example described above, for example. For instance, even in a case of object recognition on the horizontally flipped image PLR as illustrated in, for example, FIG. 10B, the present embodiment achieves a result of the object recognition similar to that on the original captured image P illustrated in FIG. 10A, unlike the case of Comparative Example described above.

As described above, in the present embodiment, the feature quantity F included in the captured image P is extracted by executing the convolution calculation using the filter FL including the multiple filter values Vf that are arranged two-dimensionally. The multiple filter values Vf in the filter FL are set at respective values that are line-symmetric with respect to the axis of symmetry As along the predetermined direction.

[As a result, the present embodiment achieves a reduction in the number of parameters (the number of values represented by the filter values Vf) included in the filter FL of the present embodiment, as compared with the case of Comparative Example described above in which the multiple filter values Vf are not line-symmetric (the multiple filter values Vf are set at any values). Specifically, in the example illustrated in FIGS. 11 and 12 described above, the number of parameters in the filter FL of the present embodiment is reduced to about one half that in the filter FLc of Comparative Example. Further, a line-symmetric performance is secured at the object identification (object recognition) based on the extracted feature quantity F in the present embodiment, for example, as described above, unlike the case of Comparative Example described above. Accordingly, it is possible in the present embodiment to secure a model performance (recognition performance) while achieving lightness of a processing model (trained model) in image processing (object recognition).

Further, in the present embodiment, the update process on the multiple filter values Vf is executed as needed every time the filter FL is updated by machine learning as described above. As a result, the multiple filter values Vf in the filter FL are set at respective values that are line-symmetric. This results in the following: that is, it is possible to easily perform the process for setting the filter values Vf at respective values that are line-symmetric.

Moreover, in the present embodiment, the update process on the filter values Vf described above is the process for updating each of every two filter values Vf located at two line-symmetric positions with respect to the axis of symmetry As described above to an average value of the two filter values Vf respectively located at the two line-symmetric positions. This results in the following: that is, it is possible to more easily perform the process for setting the filter values Vf to respective values that are line-symmetric.

In addition, in the present embodiment, the image processing apparatus 12 is mounted on the vehicle 10, and the line-symmetry of the filter values Vf described above is horizontal symmetry with respect to the axis of symmetry As described above. As the multiple filter values Vf are set at horizontally symmetric values, horizontal symmetry is secured regarding the result of object identification by the object identifier 123 in both of a case where the vehicle 10 is in the left-side travel environment and a case where the vehicle 10 is in the right-side travel environment, as described above. This results in the following: that is, by virtue of the horizontal symmetry of the object identification performance being secured both in a case of the left-side travel environment and a case of the right-side travel environment, it is possible to enhance convenience and also achieve commonality of evaluation works in machine learning to thereby reduce the number of steps of evaluation.

A specific Example according to the embodiment described above will now be described in detail while making comparisons with the case of Comparative Example or the like described above as appropriate.

FIG. 13 schematically illustrates a configuration example of a data set DS according to Example or the like. FIG. 14 schematically illustrates a configuration example of a machine learning model (a trained model of a DNN) according to Example or the like. FIGS. 15 and 16 illustrate respective examples of results of object recognition (results of Evaluations (1) and (2) to be described later) according to Comparative Example, Reference Example, and Example. Specifically, in FIG. 15, the horizontal axis represents the number of epochs, the vertical axis represents accuracy, and a case of "val (validation data)" and a case of "train (train data)" are illustrated for each of Comparative Example, Reference Example, and Examples. In contrast, in FIG. 16, the horizontal axis represents the number of epochs, and the vertical axis represents an absolute value of a difference in accuracy between an original captured image and a horizontally flipped image (|Original Accuracy−Flipped Accuracy|). FIG. 17 illustrates an example of the respective numbers of parameters (results of Evaluation (3) to be described later) according to Comparative Example and Example.

Note that Comparative Example, Reference Example, and Example illustrated in FIGS. 13 to 16 represent the following object recognition techniques using machine learning:

Comparative Example: Object recognition technique using typical machine learning (An example of the convolution calculation using the filter FLc of Comparative Example illustrated in FIGS. 9 and 10)

Reference Example: Object recognition technique involving training on a horizontally flipped image in addition to an original captured image in machine learning Example: Object recognition technique involving the convolution calculation using the filter FL of the present embodiment (Refer to the examples illustrated in FIGS. 11 and 12.)

First, in object recognition using machine learning in Example or the like (Comparative Example, Reference Example, and Example), images of clothing articles in a known data set DS (Fashion-MNIST data set) schematically illustrated in FIG. 13 were used to handle classification problems for ten classes. Further, a model illustrated in FIG. 14 was used as a machine learning model according to Example or the like. That is, a neural network was used which included (20+1) layers in total with alternate combinations of the convolution calculation CN and the activation function CA described above. Then, three kinds of evaluations (Evaluations (1) to (3)) were conducted for Example or the like. The results of the evaluations are described below.

First, the results of Evaluation (1) illustrated in FIG. 15 indicate that Example and Reference Example were higher in accuracy, that is, higher in the object recognition performance than Comparative Example. Although Example and Reference Example were substantially equivalent in performance, Example is slightly higher in performance than Reference Example. Thus, the result of the object recognition indicating the highest performance was obtained in Example.

Next, the results of Evaluation (2) illustrated in FIG. 16 indicate that the difference in accuracy described above (the absolute value of the difference in accuracy between the original captured image and the horizontally flipped image) was much larger in Comparative Example than in Example and Reference Example. A reason for this is that Comparative Example is an example of typical machine learning and is therefore horizontally asymmetric in object recognition performance, as described above. In contrast, in Reference Example, the difference in accuracy was small but was not completely "zero", which indicates that the object recognition performance was not completely horizontally symmetric. In contrast to Comparative Example and Reference Example, Example constantly achieved "zero" for the difference in accuracy described above, which indicates that the object recognition performance was completely horizontally symmetric (i.e., that horizontal symmetry of the object recognition performance was secured).

Next, the results of Evaluation (3) illustrated in FIG. 17 indicate that the number of parameters included in the filter to be used in the convolution calculation (the number of values represented by the filter values Vf) was reduced in Example, as compared with Comparative Example (see the broken-line arrow in FIG. 17). Specifically, in this example, the number of parameters was "34950" in Comparative Example, whereas the number of parameters was "22134" in Example. Thus, the number of parameters in Example was reduced to about 63% that in Comparative Example.

As described above, it was actually confirmed that a line-symmetric (horizontally symmetric) performance of object recognition was secured and the number of parameters described above was reduced to about one half in the present embodiment, as compared with Comparative Example or the like. It is to be noted that the data set used in Example or the like described above is a mere example, and even in a case where a different data set was used, similar evaluation results (object recognition results) were obtained in Comparative Example, Reference Example, and Example.

Although the disclosure is described with reference to the embodiment and Example as described above, the disclosure is not limited to those embodiments or the like, and various modifications may be made thereto.

For example, the configurations (including type, shape, arrangement, and the number of pieces) of respective components of the vehicle 10 and the image processing apparatus 12 are not limited to those described in the foregoing embodiments or the like. That is, the configuration of each of the components may be any other type, shape, arrangement, number of pieces, etc. In addition, values, ranges, magnitude relationships, etc., of various parameters described in the foregoing embodiments or the like are also non-limiting, and any other values, ranges, magnitude relationships, etc. may be employed.

Specifically, in the embodiments or the like described above, the stereo camera 11 is configured to capture images of a view in front of the vehicle 10; however, the stereo camera 11 is not limited to such a configuration. The stereo camera 11 may be configured to capture images of a view on the side of or behind the vehicle 10. Further, although an example case of using the stereo camera 11 has been described in the foregoing embodiments or the like, this example is non-limiting. For example, a monocular camera may be used to perform various processes described in the foregoing embodiments or the like.

Further, although various processes to be performed at the vehicle 10 or the image processing apparatus 12 have been described with reference to specific examples in the foregoing embodiments or the like, such specific examples are non-limiting. That is, other techniques may be used to perform those processes. Specifically, for example, techniques for setting the filter values described above and techniques for the update process on the filter values are not limited to those described in the foregoing embodiments or the like, and other techniques may be used. More specifically, the example case of line symmetry (horizontal symmetry) with respect to the axis of symmetry along the y-axis direction (column direction) has been described in the foregoing embodiments or the like, for example; however, this example is non-limiting. That is, for example, the case of line symmetry (vertical symmetry) with respect to an axis of symmetry along the x-axis direction (row direction), and the case of line symmetry with respect to an axis of symmetry along a diagonal direction may be employed. Further, the example case in which the filter values are set at the line-symmetric values by executing the update process on the filter vales as needed has been described in the foregoing embodiments or the like; however, this example is non-limiting. Another technique may be used to set the filter values at the line-symmetric values. In addition, the example case in which the convolution calculation is performed multiple times has been described in the foregoing embodiments or the like; however, this example is non-limiting. That is, for example, the convolution calculation may be performed only once, and another calculation technique may be used in combination to thereby extract the feature quantity.

Further, the series of processes described in the foregoing embodiments or the like may be performed by hardware (circuitry) or software (program). In a case where the series of processes is to be performed by software, the software includes a group of programs for causing a computer to execute various operations. Each program may be a built-in program that is incorporated in the computer in advance for use. Alternatively, each program may be installed in the computer from a network or a computer-readable medium for use, for example.

Further, the example case in which the image processing apparatus 12 is mounted on the vehicle has been described in the foregoing embodiments or the like; however, this example is non-limiting. For example, the image processing apparatus 12 may be mounted on a movable body other than a vehicle, or equipment other than a movable body.

Furthermore, the various examples described above may be applied in any combination.

The effects described herein are mere examples and non-limiting, and other effects may be achieved.

It is possible to achieve the following configurations in the disclosure.

An image processing apparatus including:
an extractor that extracts a feature quantity included in a captured image; and
an object identifier that identifies an object on the basis of the feature quantity, in which
the extractor extracts the feature quantity by executing, on the basis of the captured image, a convolution calculation using a filter including multiple filter values that are arranged two-dimensionally, and
the multiple filter values in the filter are set at respective values that are line-symmetric with respect to an axis of symmetry along a predetermined direction.

The image processing apparatus according to (1) described above, in which the multiple filter values in the filter are set to the values that are line-symmetric by executing an update process on the multiple filter values as needed every time the filter is updated by machine learning.

The image processing apparatus according to (2) described above, in which the update process is a process for updating each of every two filter values located at two line-symmetric positions with respect to the axis of symmetry to an average value of the two filter values located at the two line-symmetric positions.

The image processing apparatus according to any one of (1) to (3) described above, in which
the image processing apparatus is mountable on a vehicle,
the line symmetry is horizontal symmetry with respect to the axis of symmetry, and
by virtue of the multiple filter values set at values that are horizontally symmetric, horizontal symmetry is secured regarding
a result of identification of the object by the object identifier in a case where a travel environment for the vehicle is a left-side travel environment, and
a result of identification of the object by the object identifier in a case where the travel environment for the vehicle is a right-side travel environment.

A vehicle including:
the image processing apparatus according to any one of (1) to (4) described above; and
a vehicle controller that performs vehicle control on the basis of the result of identification of the object by the object identifier.

An image processing apparatus including:
one or more processors; and
one or more memories communicably coupled to the one or more processors, in which
the one or more processors
extracts a feature quantity included in a captured image,
identifies an object on the basis of the feature quantity, and
extracts the feature quantity by executing, on the basis of the captured image, a convolution calculation using a filter including multiple filter values that are arranged two-dimensionally, and
the multiple filter values are set at respective values that are line-symmetric with respect to an axis of symmetry along a predetermined direction.

The invention claimed is:
1. An image processing apparatus, comprising:
circuitry configured to,
obtain a result of inference of object recognition for an object based on:

defining a region of a captured image;
extracting a feature quantity included in the captured image based on executing, on a basis of the captured image, a convolution calculation using a filter including multiple filter values that are arranged two-dimensionally, wherein the feature quantity is extracted from the defined region with the filter and the region comprises a predetermined number of pixels that are equal to a number of the filter values that the filter has;
calculating a value of the extracted feature quantity;
identifying the object on a basis of the calculated value; and
assigning a category of the object in the defined region indicating what the identified object is,
update the filter by machine learning based on the result of inference of the object recognition for the object and ground truth data of the object recognition for the object, and
set the multiple filter values in the filter at respective values that are horizontally symmetric by executing an update process on the multiple filter values upon updating the filter by the machine learning based on the result of inference of the object recognition and the ground truth data of the object recognition, wherein
the update process includes updating each of every two filter values of the multiple filter values located at two horizontally symmetric positions to an average value of the two filter values located at the two horizontally symmetric positions, to obtain a horizontally symmetric filter,
the image processing apparatus is mountable on a vehicle,
by virtue of the multiple filter values set at values that are horizontally symmetric, horizontal symmetry is secured regarding:
a result of identification of the object in a case where a travel environment for the vehicle is a left-side travel environment, and
a result of identification of the object in a case where the travel environment for the vehicle is a right-side travel environment.

2. A vehicle comprising:
the image processing apparatus according to claim 1; and
a vehicle controller that performs vehicle control on a basis of the result of identification of the object.

3. The image processing apparatus according to claim 1, wherein the circuitry is configured to change the two filter values of the multiple filter values located at two horizontally symmetric positions from values different from each other to an identical value by executing the update process.

4. The image processing apparatus according to claim 3, wherein the two other filter values of the multiple filter values located at two vertically symmetric positions have values different from each other both before and after executing the update process.

5. A vehicle comprising:
a vehicle controller; and
circuitry configured to,
obtain a result of inference of object recognition for an object based on:
defining a region of a captured image;
extracting a feature quantity included in the captured image based on executing, on a basis of the captured image, a convolution calculation using a filter including multiple filter values that are arranged two-dimensionally, wherein the feature quantity is extracted from the defined region with the filter and the region comprises a predetermined number of pixels that are equal to a number of the filter values that the filter has;
calculating a value of the extracted feature quantity;
identifying the object on a basis of the calculated value; and
assigning a category of the object in the defined region indicating what the identified object is,
update the filter by machine learning based on the result of inference of the object recognition for the object and ground truth data of the object recognition for the object, and
set the multiple filter values in the filter at respective values that are horizontally symmetric by executing an update process on the multiple filter values upon updating the filter by the machine learning based on the result of inference of the object recognition and the ground truth data of the object recognition, wherein
the update process includes updating each of every two filter values of the multiple filter values located at two horizontally symmetric positions to an average value of the two filter values located at the two horizontally symmetric positions, to obtain a horizontally symmetric filter,
the circuitry is mountable on the vehicle,
by virtue of the multiple filter values set at values that are horizontally symmetric, horizontal symmetry is secured regarding:
a result of identification of the object in a case where a travel environment for the vehicle is a left-side travel environment, and
a result of identification of the object in a case where the travel environment for the vehicle is a right-side travel environment, and
the vehicle controller is configured to perform vehicle control on a basis of the result of identification of the object.

6. An image processing apparatus comprising:
one or more processors; and
one or more memories communicably coupled to the one or more processors,
wherein
the one or more processors configured to
obtain a result of inference of object recognition for an object based on:
defining a region of a captured image;
extracting a feature quantity included in a captured image based on executing, on a basis of the captured image, a convolution calculation using a filter including multiple filter values that are arranged two-dimensionally, wherein the feature quantity is extracted from the defined region with the filter and the region comprises a predetermined number of pixels that are equal to a number of the filter values that the filter has;
calculating a value of the extracted feature quantity;
identifying the object on a basis of the calculated value; and
assigning a category of the object in the defined region indicating what the identified object is, and
update the filter by machine learning based on the result of inference of the object recognition for the object and ground truth data of the object recognition for the object, and
set the multiple filter values are set at respective values that are horizontally symmetric by executing an update process on the multiple filter values upon updating the filter by the machine learning based on the result of inference of the object recognition and the ground truth data of the object recognition, wherein the update process includes updating each of every two filter values of the multiple filter values located at two horizontally symmetric positions to an average value of the two filter values located at the two horizontally symmetric positions, to obtain a horizontally symmetric filter, the image processing apparatus is mountable on a vehicle, by virtue of the multiple filter values set at values that are horizontally symmetric, horizontal symmetry is secured regarding:

a result of identification of the object in a case where a travel environment for the vehicle is a left-side travel environment, and a result of identification of the object in a case where the travel environment for the vehicle is a right-side travel environment.

7. The image processing apparatus according to claim 6, wherein the one or more processors are configured to change the two filter values of the multiple filter values located at two horizontally symmetric positions from values different from each other to an identical value by executing the update process.

8. The image processing apparatus according to claim 7, wherein the two other filter values of the multiple filter values located at two vertically symmetric positions have values different from each other both before and after executing the update process.

\* \* \* \* \*